United States Patent [19]
Kunimori et al.

[11] Patent Number: 4,728,231
[45] Date of Patent: * Mar. 1, 1988

[54] DRILL BIT STRUCTURE

[75] Inventors: Nagatoshi Kunimori; Yoshikatsu Mori; Masaaki Jindai, all of Itami, Japan

[73] Assignee: Sumitomo Electric Industries, Ltd., Osaka, Japan

[*] Notice: The portion of the term of this patent subsequent to Apr. 22, 2003 has been disclaimed.

[21] Appl. No.: 707,970

[22] Filed: Mar. 4, 1985

[30] Foreign Application Priority Data

Mar. 12, 1984 [JP] Japan .................. 59-34145

[51] Int. Cl.⁴ ............... B23B 27/10; B23B 27/18; B23B 51/06
[52] U.S. Cl. .................... 408/59; 408/144; 408/230
[58] Field of Search ............ 408/56, 57, 58, 59, 408/227, 228, 229, 230, 200, 713, 210, 60, 715, 226, 144; 407/119

[56] References Cited
U.S. PATENT DOCUMENTS

| | | | |
|---|---|---|---|
| 1,407,546 | 2/1922 | Joseph | 408/230 X |
| 1,887,372 | 11/1932 | Emmons | 408/144 |
| 1,887,374 | 11/1932 | Emmons | 408/144 |
| 2,555,302 | 6/1951 | Cogsdill | 408/226 |
| 2,778,252 | 1/1957 | Oxford, Jr. | 408/230 |
| 3,014,386 | 12/1961 | Kallio | 408/229 |
| 3,564,947 | 2/1947 | Maier | 408/230 X |
| 4,160,616 | 7/1979 | Winblad | 408/229 |
| 4,583,888 | 4/1986 | Mori et al. | 408/59 |

FOREIGN PATENT DOCUMENTS

| | | |
|---|---|---|
| 0127009 | 5/1984 | European Pat. Off. . |
| 594043 | 2/1934 | Fed. Rep. of Germany . |
| G8203911 | 8/1982 | Fed. Rep. of Germany . |
| 3205051 | 8/1983 | Fed. Rep. of Germany . |
| 887811 | 11/1943 | France . |
| 1068867 | 7/1954 | France ............... 408/230 |
| 1190274 | 10/1959 | France . |
| 44293 | 4/1979 | Japan ................ 407/119 |
| 85653 | 6/1980 | Japan ................ 408/144 |
| 56896 | 2/1969 | Poland .............. 408/210 |

OTHER PUBLICATIONS

Machines Production, No. 365, Nov. 18, 1983, pp. 37-39, Sofetec, Boulogne, France.

*Primary Examiner*—Z. R. Bilinsky
*Attorney, Agent, or Firm*—W. G. Fasse; D. H. Kane, Jr.

[57] ABSTRACT

A drill bit structure has a drill bit body 4 and a plate-like hard tip member 9. The cutting end of the drill bit body 4 has a groove 7 extending substantially at right angles to the central drill bit axis, and the hard tip 9 is fitted and fixed in the groove 7. The web thickness is 25–35% of the drill bit diameter and the flute width ratio is 0.4:1 to 0.8:1. The rake angle of each cutting lip 10 measured at positions spaced at least ⅔ of the drill bit diameter radially outward from the drill bit center is in the range of $-5°$ to positive values.

15 Claims, 21 Drawing Figures

DRILL BIT STRUCTURE

CROSS-REFERENCE TO RELATED APPLICATION

The present disclosure is related to copending application U.S. Ser. No. 605,879, filed on May 1, 1984, now U.S. Pat. No. 4,583,888, which issued on Apr. 22, 1986.

BACKGROUND OF THE INVENTION

1. Technical Field of the Invention

This invention relates to a drill bit structure having an improved cutting end construction and particularly it relates to a drill bit structure having a hard tip fitted and fixed in a groove formed in the cutting end of the drill bit body.

2. Description of the Prior Art

Generally, drill bits of high speed steel have heretofore been used in drilling steel and cast iron work pieces. However, today when there is much need to maximize the efficiency of drilling operations, there are many cases where the drill rpm (cutting speed) is increased to meet this need. Under such circumstances, increasing use is being made, as a drill bit material, of cemented carbide, which is superior in wear resistance. However, cemented carbide has an inferior cross-break strength as compared to high speed steel and hence it is not a satisfactory material so far as the strength required for withstanding the cutting resistance is concerned. For these reasons, with the same construction as in conventional high speed drills it is impossible to fully develop the performance of cemented carbide drill bits and they can be used only under moderate cutting conditions.

In drilling operations, the quality of the chip ejecting function or ability influences the cutting resistance. The greater the drilling depth, the greater the cutting resistance, thus making it necessary to improve the chip ejecting ability so as to prevent an increase in the cutting resistance. This is a matter of great importance particularly to cemented carbide drill bits.

A drill bit which has solved the aforesaid problems of the cross-break strength and of the chip ejecting ability is disclosed in European Patent Publication No. 0,127,009, wherein the entire drill bit is made of cemented carbide alloy or the like. European Patent Publication No. 0,127,009 corresponds to the above U.S. Pat. No. 4,583,888.

Thus, if the drill bit diameter is comparatively small and hence the bulk of the entire drill bit is not much, making the entire drill bit of a hard material, e.g., a cemented carbide alloy, would not cost much since the amount of cemented carbide alloy used is small and so is the number of processing steps involved.

However, where medium- and large-sized drill bits are to be produced, making such drill bits entirely of a cemented carbide alloy would naturally result in an increased amount of cemented carbide alloy used and in an increased number of processing steps involved, leading to the disadvantage of high costs.

A drill bit construction entirely different from that of the aforesaid drill bit is disclosed in Japanese Patent Publication No. 116795/1979, wherein a throwaway tip is attached to the cutting end of the drill bit structure. However, this type of conventional throwaway tip is so constructed that a plurality of throwaway tips, rather than a single one, form the cutting lips. If, therefore, the drilling speed is increased to perform high speed drilling, there would be a problem when the cutting end of the drill bit body chatters. Further, where the tips are not symmetrically attached to the drill bit body, there would be a problem in assuring a balance of symmetry with respect to the center of rotation of the drill bit structure. Further, because of the low attaching strength, there has been a problem in the form of a severe vibration produced during drilling.

An example of a drill bit having a cemented carbide alloy tip attached to the cutting end is disclosed in Japanese Patent Publication No. 46928/1981, wherein the cutting end of the drill bit body has a groove and a plate-like tip of cemented carbide alloy is fitted and fixed in said groove, whereby a single cemented carbide alloy tip forms the lips in their entirety and hence the vibration disadvantage found in the drill bit of Japanese Patent Publication No. 116795/1979 described above, has been eliminated.

In the drill bits disclosed in both Japanese Patent Publications Nos. 46928/1981 and 116795/1979, however, have not solved the aforesaid problems of the cross-break strength and of a poor chip ejecting ability.

SUMMARY OF THE INVENTION

Accordingly, a main object of this invention is to provide an inexpensive drill bit structure which solves the aforesaid various problems and which has a decreased cutting resistance and an improved chip ejecting ability, thus ensuring a smooth chip ejection and rendering the drill bit suitable for high speed drilling.

In a broad aspect of this invention, there is provided a drill bit structure comprising a drill bit body and a hard tip fitted and fixed in a groove formed in the cutting end of the drill bit body, wherein the web thickness is 25–35% of the drill bit diameter, the flute width ratio is 0.4:1 to 0.8:1, and the rake angle of each cutting lip measured at positions spaced at least $\frac{2}{3}$ of the drill diameter radially outwardly from the drill center is in the range of $-5°$ to positive values. Thus, according to this invention, there is obtained an inexpensive drill structure wherein even if the drill is rotated at high speed, the cutting resistance is low and a smooth chip ejection is ensured. The term "flute width ratio" relates the circumferential width of the flutes of the drill bit to the circumferential width of the lands of the drill bit. The above ratio shows that the lands have a larger circumferential width than the flutes.

In a particular aspect of this invention, the hard tip is formed with an arcuate chip breaker. Further, the thickness of the hard tip is preferably greater than at least the web thickness, whereby damage due to chips produced by the drilling can be effectively avoided.

The hard tip of this invention may be made of cemented carbide alloy, high speed steel or CBN (cubic boron nitride) sintered compact, for example. Further, the hard tip may be coated with TiC, TiCN, TiN or $Al_2O_3$ to further increase the wear resistance; the coating of this type of material may extend also to other areas of the drill structure in addition to the hard tip.

This object and other objects, features, aspects and advantages of the present invention will become more apparent from the following detailed description of the present invention when taken in conjunction with the accompanying drawings.

DESCRIPTION OF PREFERRED EMBODIMENTS

Figure 1:
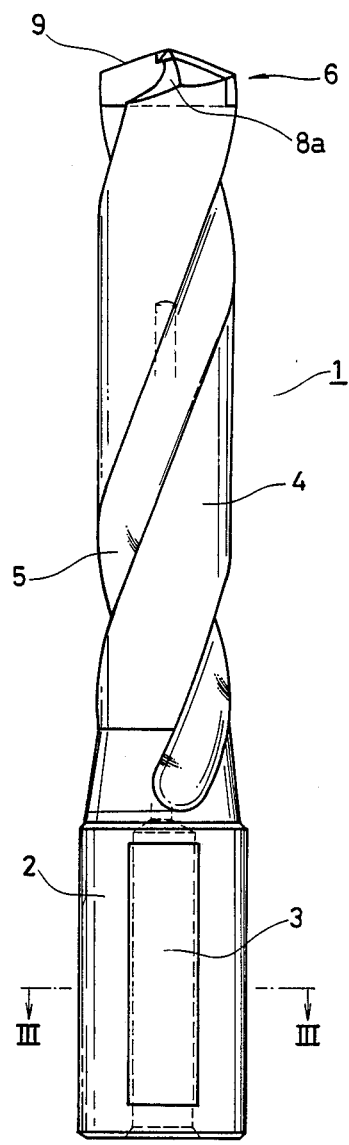
FIG. 1 is a side view of a drill bit embodiment of this invention.
Figure 4:
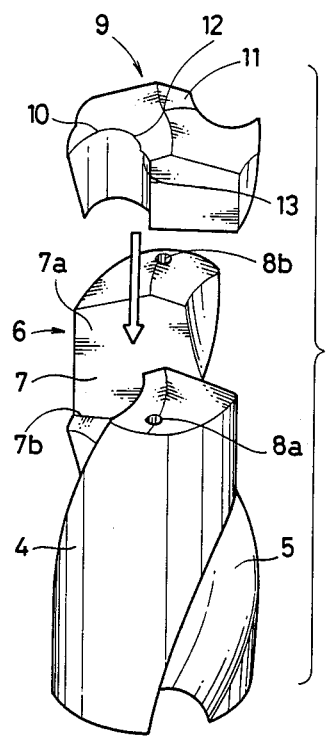
FIG. 4 is a perspective view showing how a hard tip is installed in a groove formed in the cutting end of the drill bit shown in FIG. 1.

As shown in a side view in FIG. 1, a drill bit structure 1 according to this invention has a flat surface 3 formed on its shank 2 for attaching the drill bit to a chuck. The drill body 4 is smaller in diameter than the shank 2 and has two flutes 5 having a predetermined twist angle as is conventional. The cutting end 6 of the drill bit body 4 has a groove 7 extending at a right angle to the axis of the drill bit body 4, as shown in FIG. 4. The center of the groove 7 coincides with the axis of the drill bit body 4, and the opposite wall surfaces, i.e., opposite lateral surfaces 7a and 7b of said groove 7 are flat.

As shown in FIG. 4, a hard tip 9 is fitted in the groove 7 and fixed therein as by soldering. In this drill bit, as will be described below, the cutting lips 10 are formed by this hard tip 9, with the result that a balanced symmetry with respect to the center of rotation of the drill bit during a drilling operation is reliably and easily attained.

In addition, in the drill bit structure shown in FIG. 1, the shank 2 and drill bit body 4 may be made of high speed steel, for example. Further, the hard tip 9 may be made of a cemented carbide alloy, high speed steel, cubic boron nitride sintered compact (CBN sintered compact) or other hard material. Preferably, a hard tip 9 made of cemented carbide alloys is used and its surface is coated with TiC, TiCN, TiN or $Al_2O_3$.

Figure 2:
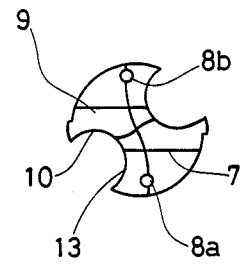
FIG. 2 is a front view of the embodiment of FIG. 1, looking at the cutting end of the drill bit.
Figure 3:
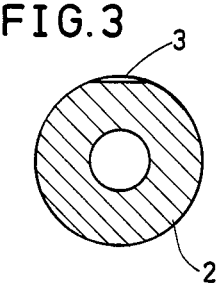
FIG. 3 is a sectional view taken along section line III—III of FIG. 1.

In addition, in FIGS. 1 and 2, oil passages 8a, 8b extend from the front end of the cutting portion 6 to the base end of the shank 2.

The construction of the hard tip 9 which characterizes the invention will now be described. The hard tip 9 has a thickness, or length along the axis of the drill body 4, equal to at least the web thickness of the front end of the drill bit body 4 and is so formed as to serve as curved chip breaker. In the drill bit structure shown in FIGS. 1 and 2 wherein the hard tip 9 is mounted and fixed in the groove 7, the web thickness is 25–35% of the drill bit diameter, the flute width ratio is 0.4:1 to 0.8:1, and the rake angle of each outer cutting lip 10 measured at positions spaced at least ⅔ (two thirds) of the drill bit diameter radially outwardly from the drill bit center, is in the range of $-5°$ to positive values. The web thickness of diameter is shown by the inner circle in FIG. 5.

Figure 19:
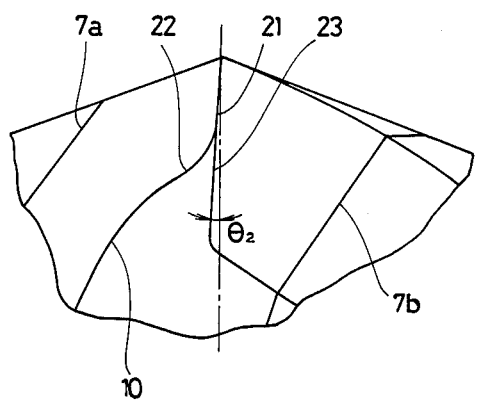
FIG. 19 is an enlarged side view of a portion of the drill bit cutting end taken in the direction of arrow A in FIG. 5.
Figure 20:
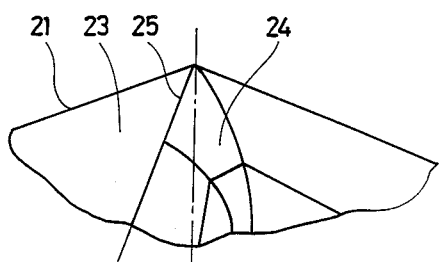
FIG. 20 is an enlarged side view of a portion of the drill bit cutting end taken in the direction of arrow B in FIG. 5.
Figure 5:
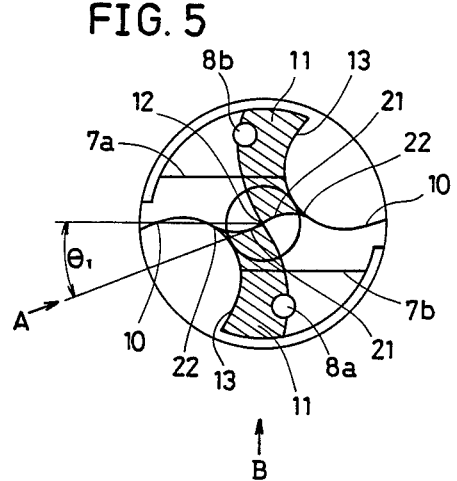
FIG. 5 is a front view for explaining a thinning treatment applied to the embodiment shown in FIG. 1.

Further, the cutting lips of the hard tip 9 have been subjected to thinning, thereby forming portions 11 shown by hatched regions in FIG. 5 providing a width of a chisel 12 in the range of 0–0.4 mm, cutting lips 21 formed at the end of the web corresponding to chisel lips which are substantially straight, and an angle $\theta_1$ between the cutting lip 21 and the peripheral cutting lip 10 in the range of 35° to 45°. Further, a connecting or transition portion 22 between the cutting lip 21 of the web and the outer cutting lip 10 is so formed as to describe a convex arc with respect to the direction of rotation of the drill bit structure 1. Further, the axial rake angle $\theta_2$ of a rake surface 23 shown in FIG. 19 formed by the thinning is set in the range of $-5°$ to $+5°$, and the axial length of said rake surface 23 is 0 mm at the drill axis. An intersection line 25 defined between the rake surface 23 and an adjacent ground surface 24 in FIG. 20 formed simultaneously with said rake surface 23 by the thinning, defines relative to the vertical an angle of inclination $\theta_3$ which is in the range of 25° to 60° with respect to the drill axis.

The function of the above embodiment described with reference to FIGS. 1 to 5 and FIGS. 19 and 20 will now be described.

When the drill bit structure 1 is used for drilling, e.g., a steel work piece, it will be seen that since the hard tip 9, at the cutting end of the drill body 4, secures accuracy of symmetry with respect to the center of rotation, the resulting vibration is much less than in a conventional cemented carbide drill having a bisected cutting tip. Further, since the hard tip 9 is made of such a hard material as cemented carbide alloy, CBN sintered compact or high speed steel, any cutting by the cutting lips can be performed as desired. Further, the drill bit body 4, which is made of high speed steel or alloy steel, has a sufficient rigidity and toughness. Thus, the drill bit structure 1 has both, the necessary cutting capability and the necessary strength, so that satisfactory cutting can be effected.

In the cutting portion 6, because of the use of the plate-like hard tip 9, a lateral wall portion 13 unconnected to the cutting lip 10, is formed on the drill bit body 4 so that it is curved, as shown in FIG. 5 for causing chips to finely curl, with the consequent smooth ejection of chips.

Further, the thickness of the hard tip 9, e.g. its length axially of the drill bit structure, is greater than at least the web thickness. Thus, in the front ends of the chip ejection flutes 5, most of the lateral walls facing the flute are made of hard material, so that damage due to the rubbing of chips can be prevented. In the conventional drill structures, chips rub against the chip ejection flutes, abrading the lateral walls of the chip ejection flutes, which can result in perforating the walls of the oil passages 8a, 8b. With the drill structure 1 of this embodiment, however, no such problem can occur since the hard tip 9 has the aforesaid thickness.

The function of the shape of the cutting portion in this embodiment will now be described.

As described above, the web thickness is set in the range of 25-35% of the drill bit diameter. This feature provides the required rigidity. It has been found that setting the web thickness to less than 25% would result in an insufficient rigidity while setting it at more than 35% would result in a reduced chip ejection capability.

The flute width ratio is set in the range of 0.4:1 to 0.8:1, to make sure that the curling or breaking of chips produced by the cutting lips 10 takes place most smoothly.

Further, if the radial rake angle of each outer cutting lip 10, as seen in the end view, measured at positions spaced at least ⅔ of the drill diameter outwardly from the drill center, is negative, this would result in an increase in the cutting resistance and a decrease in rigidity. Reversely, if the positive rake angle is increased, the strength of the outer peripheral portion of the cutting lip 10 would decrease. Thus, taking these opposite factors into account, this invention specifies that the aforesaid radial rake angle be in the range of −5° to positive values, preferably in the range of 0° to +10°.

The reason why the positions at which the radial rake angle is set in the range of −5° to positive values, are defined as being spaced from the center at least ⅔ of the diameter of the drill bit, is that if the web thickness is 30%, then the length of the cutting lip 10 is about ⅔; thus, if more than ½ of the cutting lip 10 has positive rake angles, a sufficient performance can be attained.

In the case where the cutting lip 10 is given a concavely arcuate form so that the rake angle in the outer peripheral region is in the range of −5° to positive values, as shown in FIG. 5, the production of chips will be shared by the longer portion of the cutting lip 10. Therefore, in the case of the cutting lip 10 of this embodiment, as compared with a straight cutting edge, chips can be smoothly ejected and the cutting chip 10 is lengthened, so that work to be done per unit length of the cutting lip is decreased, leading to an increase in wear resistance.

As described above, in the drill structure of this embodiment, the web is thicker than that of conventional twist drills. Therefore, if the chisel width is not decreased by proper thinning, the cutting resistance would increase to the extent of crushing the front end. In the drill of this embodiment, therefore, the portions 11 formed by thinning have a cross-thinning configuration as shown in FIG. 5. The chisel 12 has a width in the range of 0–0.4 mm, the cutting lip 21 of the web portion is substantially linear, and the angle $\theta_1$ formed between said cutting lip 21 and the outer cutting lip 10 is set in the range of 35° to 45°. The connecting portion 22 between the cutting lip 21 of the web portion and the outer cutting lip 10 defines a convex arc with respect to the direction of rotation of the drill bit structure 1. Therefore, vibrations occurring during drilling are reduced and chips tend to curl more easily, so that ejection of chips is promoted.

As stated above, the axial rake angle $\theta_2$ of the rake surface 23 of the web portion formed by thinning is set in the range of −5° to +5°. The axial length of the rake surface 23 is 0 mm at the drill axis position. The intersection line 25 between the rake surface 23 and the adjacent ground surface 24 formed simultaneously with the rake surface 23 has an angle of inclination $\theta_3$ with the drill axis in the range of 25° to 60°. Therefore, the angle of inclination $\theta_3$ is such that the axial length of the rake surface 23 is sufficient to prevent chips being produced, from striking the adjacent ground surface 24 to increase thrust. Further, the angle $\theta_3$ makes sure that the chip breaking function and the strength of the drill bit structure are sufficient.

The following experiments were made with the drill bit structure of the embodiment of the invention and with drill bit structures of conventional examples 1 and 2 prepared for comparison purposes, as shown in Table 1 below.

TABLE 1

| Drill | Web thickness in mm | Flute width ratio | Rake angle in degrees | Relative distance |
|---|---|---|---|---|
| Embodiment | 5.6 | 0.42:1 | +10° | 0.16 × D |
| Comparative example 1 | 5.6 | 0.42:1 | −12° | 0.29 × D |
| Comparative example 2 | 3.5 | 0.9:1 | −7° | 0.5 × D |

Figure 21:
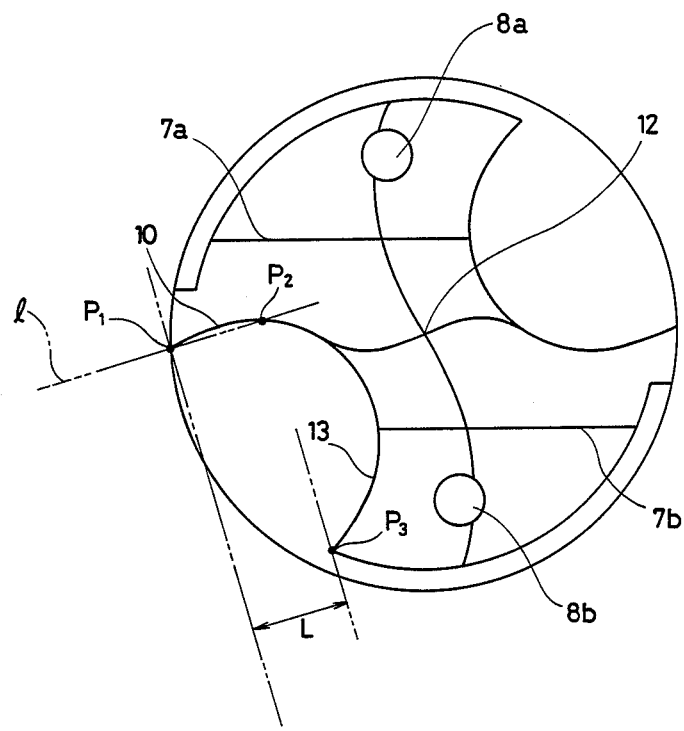
FIG. 21 is an enlarged plan view of the cutting end of the drill bit for explaining relative distances.

As shown in FIG. 21, the relative distance in Table 1 refers to a distance L from point P3 on the flute wall opposite to the cutting lip 10 to a line extending at a right angle to an imaginary reference line l connecting the point P1, which is at the outer peripheral end of the cutting lip 10, and point P2 on the cutting lip 10 spaced ⅔ of the radius from the central axis toward the outer periphery.

Comparative example 1 is not generally used but was prepared as a model sample to represent a typical bit for comparison purposes. The diameter of each drill bit was 20 mm and the cutting tip material was cemented carbide alloy P30 plus a TiCN coating.

Figure 6:
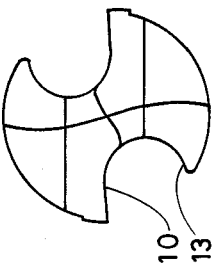
FIG. 6 is a cutting end view looking at the front end of the drill bit shown in FIG. 1.
Figure 7:
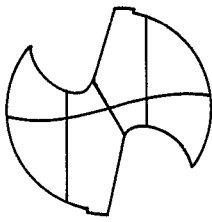
FIGS. 7 and 8 are cutting end views looking at the front ends of drill bit structures used for Comparative Examples 1 and 2, the views corresponding to that of FIG. 6.
Figure 8:
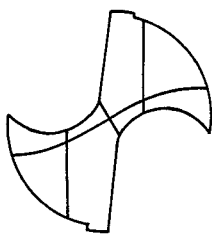

The cutting end configuration of each drill bit was as shown in FIG. 6 for the embodiment of the invention, in FIG. 7 for the comparative example 1, and FIG. 8 for the comparative example 2.

First Experiment (Drilling test)

Experimental conditions: cutting speed (V)=60 m/min, feed (f)=0.5 mm/rev, penetration length=60 mm.

Material to be cut: SCM 440, Hb=300, water-soluble cutting oil used as a coolant.

The results were as shown in Table 2.

TABLE 2

| Drill | Number of holes drilled until breakage | |
|---|---|---|
| | First time | Second time |
| Embodiment | 205 holes were successfully drilled | 190 holes |
| Comparative example 1 | 188 holes | 95 holes |
| Comparative example 2 | 10 holes | 88 holes |

In addition, the comparative example 1 had a high strength and in some respects provided data comparable to that of the embodiment, but was poor in chip disposal and its cutting resistance was so high that it broke.

Further, the comparative example 2, though satisfactory in chip disposal and cutting resistance, was low in strength.

Thus, so far as the result of this drilling test is concerned, it is seen that the drill bit of the invention is superior to the drill bits of the comparative examples 1 and 2.

Cutting Resistance Test

Figure 9:
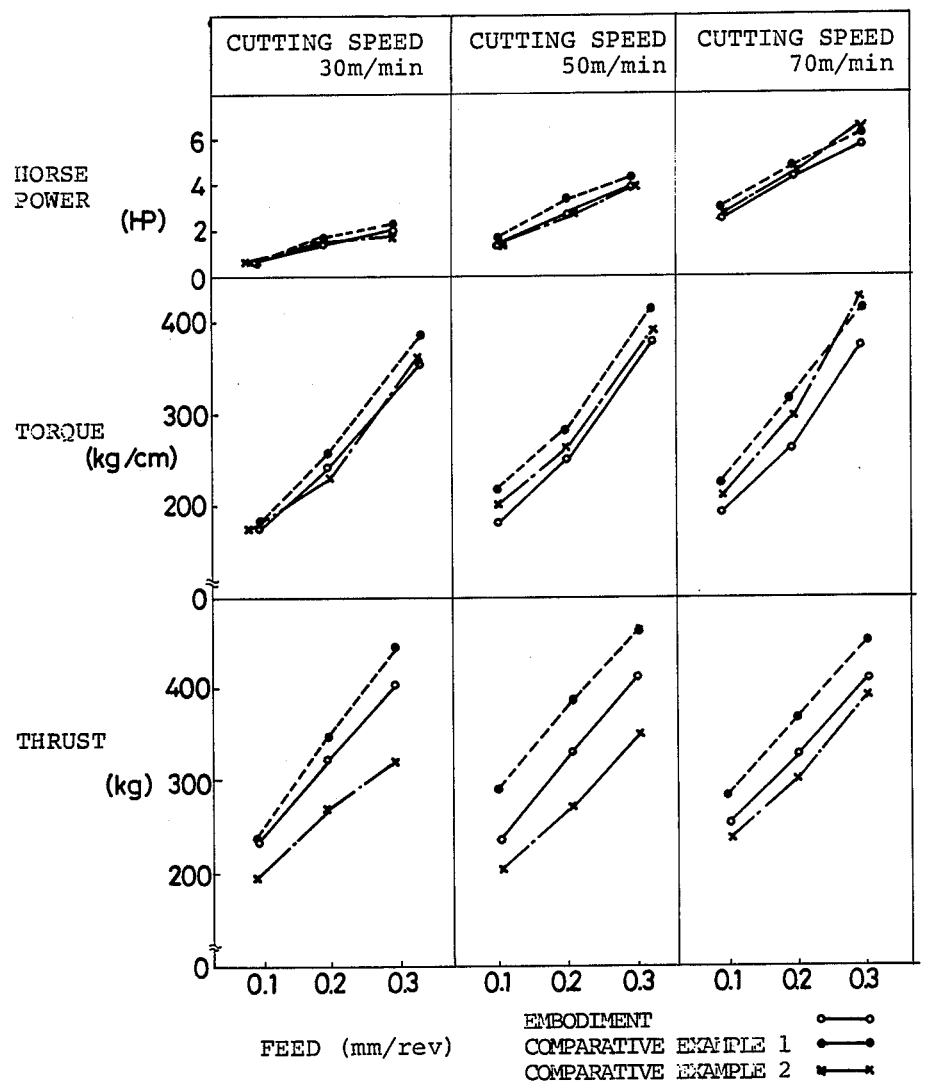
FIG. 9 shows performance characteristics of the drill bit of the invention shown in FIG. 6 compared to the respective characteristics of conventional drill bits shown in FIGS. 7 and 8.

The embodiment and comparative examples 1 and 2 were tested for cutting resistance. The result was as shown in FIG. 9 in which the feed (mm/rev) is plotted on the horizontal axis and on the vertical axis are plotted thrust (Kg), torque (Kg×cm) and horse power (HP).

In Table 3 drawn up on the basis of this graph, values are expressed in terms of proportion when the respective values for the conventional drill bits of the comparative example 2 are taken as unity.

TABLE 3

| Drill | Thrust | Torque | Horse Power |
|---|---|---|---|
| Embodiment | 1.28 | 0.98 | 0.97 |
| Comparative example 1 | 1.42 | 1.08 | 1.06 |
| Comparative example 2 | 1 | 1 | 1 |

In this experiment, S 48C (HB 230) was used as the material to be cut and water-soluble cutting oil was used as the coolant.

It can be seen from the result of this test that with the comparative examples 1 and 2, even if the cross-sectional area is increased while the flute width ratio is decreased and the web thickness is increased so as to increase the strength, both thrust and torque increase and so does the horse power, a fact which means an adverse effect. In contrast, with the drill bit of the embodiment of this invention, it is seen that since the web thickness is increased, the thrust slightly increases but the torque and horse power decrease and so does the cutting resistance.

That is, although the web thickness is increased and a thrust increase of about 30% is caused, the radial rake angle of about 10° results in substantial decreases in both torque and horse power. Of course, since the conventional drill bit of the comparative example 1 has a radial rake angle of −12°, both torque and horse power are high and so is the thrust; thus, it is not a satisfactory drill bit.

Figure 10:
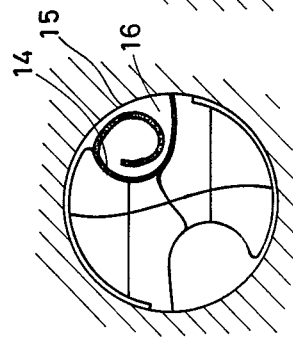
FIG. 10 is an end view of the present drill bit for explaining the chip ejection associated with the end configuration shown in FIG. 6, but showing the drill bit structure in a drilling operation.
Figure 11:
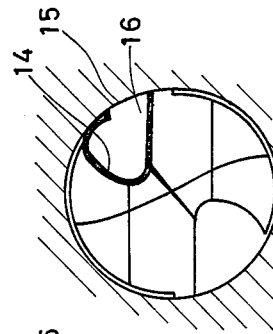
FIGS. 11 and 12 are views, corresponding to FIG. 10, of the cutting ends of the drill bit structures of Comparative Examples 1 and 2 shown in FIGS. 7 and 8, again showing the drill bits in operation.
Figure 12:
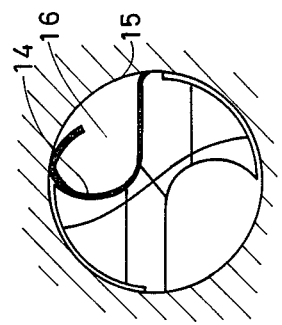

The roughness of the cut finished surface will now be described. In the drill of the embodiment of this invention, the construction which makes the radial rake angle positive improves the sharpness of the drill bit, and the short, relative distance L ensures that a chip 14 curls in the hole 16 without abutting against the hole wall 15 and is discharged in the hole 16, as shown in FIG. 10 or discharged while being broken.

On the other hand, in the comparative examples 1 and 2, since the relative distance L is long and since the sharpness is not good, the chip 14 abuts against the hole wall 15 and breaks and hence the cut finish is rough.

Figure 13:
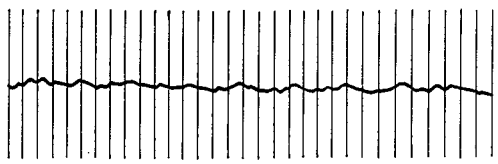
FIG. 13 is a view for explaining the accuracy of the drilled surface of a sample drilled by using the present drill bit embodiment shown in FIG. 1.
Figure 14:
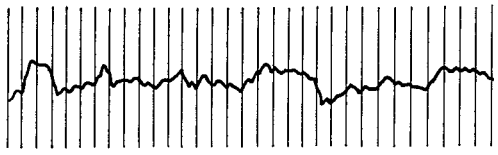
FIGS. 14 and 15 are views showing the accuracy of the drilled surfaces of samples drilled by using the drill bit structures of Comparative Examples 1 and 2 shown in FIGS. 7 and 8, the views corresponding to that of FIG. 13.
Figure 15:
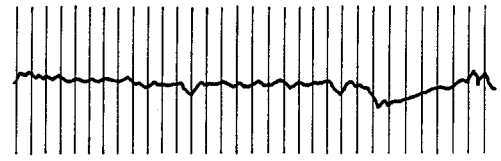

The data on the finished surface roughness are as shown in FIGS. 13, 14 and 15, wherein the scale on the horizontal axis (depth) is magnified 10 times and the scale on the vertical axis (radial unevenness) is magnified 250 times.

As can be seen from each figure, the finished surface obtained by the drill of the embodiment of this invention is very good.

Figure 16:
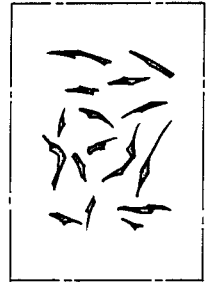
FIG. 16 is a view showing chips produced by a drilling operation using the embodiment shown in FIG. 1.
Figure 17:
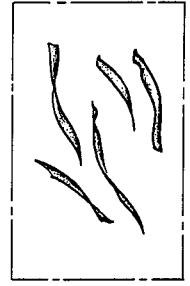
FIGS. 17 and 18 are views showing chips produced by drilling operations using the drill bit structures of the Comparative Examples 1 and 2 shown in FIGS. 7 and 8.
Figure 18:
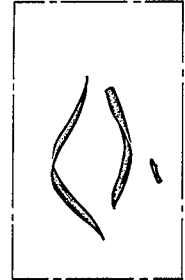

It is seen also from FIGS. 16, 17 and 18 that since the relative distance is short and since the sharpness is good, the chip 14 curls in the hole 16 and breaks into small pieces which then also curl at small radii.

Thus, it is seen also from this fact that in the drill of the embodiment of this invention, the chip 14 breaks into small pieces and curls and is discharged in the hole 16. As is clear also from the aforesaid experimental data, the finished surface of the drilled hole is good without being roughened and there is no danger of making a hole in the flute wall 13.

It is clear that the smaller the allowance for enlarging the hole 16 and the smaller the amount of variation thereof, the higher the drilling accuracy. Respective experimental data are shown in Table 4.

TABLE 4

| | Allowance for enlargement | Unit in μm |
|---|---|---|
| Drill | Average | Variation |
| Embodiment | 5.2 | 3.7 |
| Comparative example 1 | 17.3 | 4.1 |
| Comparative example 2 | 43.5 | 15.8 |

Because of the combination of the effect of the rake angle being positive and the effect of the twisting strength and rigidity and bending rigidity being high and the accuracy of symmetry with respect to the center of the tip 9 is sufficiently constant, the allowance for the enlargement of drilled holes is much less in the drill bits of the embodiment of this invention than in the conventional drill bits. It is also seen that the variation of allowance is less, proving the superiority of the drill bits of this invention.

As a matter of course, the amount of burr which forms when the drill bits thrust through the work indicates the effect of sharpness, the test result being as shown in Table 5.

TABLE 5

| | Amount of Burr | Unit, μm |
|---|---|---|
| Drill | Average | Variation |
| Embodiment | 0.43 | 0.07 |
| Comparative example 1 | 0.57 | 0.12 |
| Comparative example 2 | 0.41 | 0.06 |

As can be seen from the data of Table 5, in the embodiment the sharpness does not so much differ from that in the comparative example 2, but its variation is much less, thus indicating that it is possible to improve the accuracy of the product where the drill bit is repeatedly used.

The overall ratings of the respective drill bits are as shown in Table 6. The mark X means "undesirable," the mark ○ means "desirable," and the mark ⊚ means "superior". Thus, it is seen that the drill bit of this embodiment is the best of all, next comes the heretofore actually used drill bit of the comparative example 2, and the worst is the drill bit of the comparative example 1 produced merely as a model.

TABLE 6

| Drill | Strength | Cutting force | Finished surface | Chips | Allowance for enlargement | Burr | Overall rating |
|---|---|---|---|---|---|---|---|
| Embodiment | ⊚ | ○ | ⊚ | ⊚ | ⊚ | ○ | ⊚ |
| Comparative example 1 | ○ | X | X | X | ○ | X | X |
| Comparative example 2 | X | ⊚ | ○ | ⊚ | X | ⊚ | ○ |

In addition, actually usable samples for use in various tests in this invention were produced for comparison with samples of conventional form, the particulars of these samples being as shown in Table 7. Apart from effectiveness, these samples were capable of actual use.

TABLE 7

| | Web thickness | Flute width ratio | Rake angle | Relative distance |
|---|---|---|---|---|
| Conventional article | 15% | 1:1 | −8.5° | 0.48 × D |
| | 23% | | −17° | 0.48 × D |
| | 15% | 1.3:1 | −8.5° | 0.6 × D |
| | 23% | | −17° | 0.58 × D |
| Inventive article | 25% | 0.8:1 | −5° | 0.47 × D |
| | | | 0° | 0.42 × D |
| | | | +10° | 0.31 × D |
| | 35% | 0.4:1 | −5° | 0.23 × D |
| | | | 0° | 0.18 × D |
| | | | +10° | 0.11 × D |

Although the invention has been described and illustrated in detail, it is clearly understood that the same is by way of illustration and example only and is not to be taken by way of limitation, the scope of the present invention being limited only by the terms of the appended claims.

What is claimed is:

1. A drill bit structure comprising a drill bit body having lands with a given first circumferential width (a) and, between the lands, flutes with a second circumferential width (b), said lands being interconnected by a web having a thickness (c), said drill bit body further having a diamter (d), a shank at one end thereof and a tip at the other end of said drill bit body, a groove in said drill bit tip, a hard tip member fitted and fixed in said groove, said web thickness (c) corresponding to 25-35% of said drill bit diameter (d), said drill bit body further having a flute width ratio in the range of 0.4:1 to 0.8:1, whereby said flute width ratio is defined as said flute width (b) divided by said land width (a), and wherein said drill bit body tip is formed so that its radial rake angle of an outer peripheral cutting lip as measured at positions spaced at least ⅔ of the drill bit diameter radially outwardly from a central drill bit axis is in the range of −5° to positive values.

2. The drill bit structure of claim 1, wherein said hard tip member has a curved wall portion (13) forming a chip breaker.

3. The drill bit structure of claim 2, wherein said hard tip member has a thickness greater than at least said web thickness (c).

4. The drill bit structure of claim 1, wherein said hard tip member has a chisel formed by a thinning, said chisel having a width in the range of 0 to 0.4 mm, said hard tip member having a web portion including inner substantially straight cutting lips formed on said web portion by thinning and wherein an angle ($\theta_1$) between one of said inner cutting lips (21) and the outer peripheral cutting lip (10) formed on an outer periphery of said drill bit body is in the range of 35° to 45°, and wherein a connecting portion between said inner cutting lips and said outer peripheral cutting lip is in the form of a convex arc with respect to the direction of rotation of the drill bit body.

5. The drill bit structure of claim 4, wherein an axial rake angle of said inner cutting lip formed by thinning is in the range of −5° to +5°, said hard tip member having a rake surface having a length in the direction of said central drill bit axis of 0 mm at said central drill bit axis, and wherein an intersection line between said rake surface and an adjacent ground surface which is simultaneously formed by said thinning, forms an angle in the range of 25°-60° with said central drill bit axis.

6. The drill bit structure of claim 2, wherein said hard tip member has a chisel formed by a thinning, said chisel having a width in the range of 0 to 0.4 mm, said hard tip member having a web portion including inner substantially straight cutting lips formed on said web portion by thinning and wherein an angle ($\theta_1$) between one of said inner cutting lips (21) and the outer peripheral cutting lip (10) formed on an outer periphery of said drill bit body is in the range of 35° to 45°, and wherein a connecting portion between said inner cutting lips and said outer peripheral cutting lip is in the form of a convex arc with respect to the direction of rotation of the drill bit body.

7. The drill bit structure of claim 6, wherein an axial rake angle of said inner cutting lip formed by thinning is in the range of −5° to +5°, said hard tip member having a rake surface having a length in the direction of said central drill bit axis of 0 mm at said axis, and wherein an intersection line between said rake surface and an adjacent ground surface which is simultaneously formed by said thinning, forms an angle in the range of 25°-60° with said central drill bit axis.

8. The drill bit structure of claim 3, wherein said hard tip member has a chisel formed by a thinning, said chisel having a width in the range of 0 to 0.4 mm, said hard tip member having a web portion including inner substantially straight cutting lips formed on said web portion by thinning and wherein an angle ($\theta_1$) between one of said inner cutting lips (21) and the outer peripheral cutting lip (10) formed on an outer periphery of said drill bit body is in the range of 35°–45°, and wherein a connecting portion between said inner cutting lips and said outer peripheral cutting lip is in the form of a convex arc with respect to the direction of rotation of the drill bit body.

9. The drill bit structure of claim 8, wherein an axial rake angle of said inner cutting lip formed by thinning is in the range of −5° to +5°, said hard tip member having a rake surface having a length in the direction of said central drill bit axis of 0 mm at said axis, and wherein an intersection line between said rake surface and an adjacent ground surface which is simultaneously formed by said thinning, forms an angle in the range of 25°–60° with said central drill bit axis.

10. The drill bit structure of claim 1, wherein said hard tip member is made of cemented carbide alloy.

11. The drill bit structure of claim 1, wherein said hard tip member is made of high speed steel.

12. The drill bit structure of claim 1, wherein said hard tip member is made of CBN (cubic boron nitride) sintered compact.

13. The drill bit structure of claim 1, comprising an oil passage through said drill bit body, said oil passage extending from said shank of said drill bit body to an end surface of said drill bit tip, said oil passage being so locate as not to contact cutting lips on said end surface.

14. The drill bit structure of claim 1, wherein at least said hard tip member is coated with a compound selected from the group consisting of TiC, TiCN, TiN and $Al_2O_3$.

15. A drill bit structure, comprising a drill bit body having lands with a given first circumferential width (a) and, between the lands, flutes with a second circumferential width (b), said lands being interconnected by a web having a thickness (c), said drill bit body further having a diameter (d), a shank at one end thereof and a tip at the other end of said drill bit body, a groove in said drill bit tip, a hard tip member fitted and fixed in said groove, said web thickness (c) corresponding to 25 to 35% of said drill bit diameter (d), said drill bit body further having a flute width ratio in the range of 0.4:1 to 0.8:1, whereby said flute width ratio is defined as said flute width (b) divided by said land width (a), and wherein said drill bit body tip including said hard tip member is formed so that its radial rake angle of an outer peripheral cutting lip, as measured at positions spaced at least $\frac{2}{3}$ of the drill bit diameter radially outwardly from a central drill bit axis, is in the range of −5° to positive values, and wherein said drill bit tip including said hard tip member forms a rake surface (23) the axial length of which is zero at said central drill bit axis, to provide rotational symmetry with respect to a center of rotation defined by said central drill bit axis.

* * * * *